Patented Feb. 10, 1925.

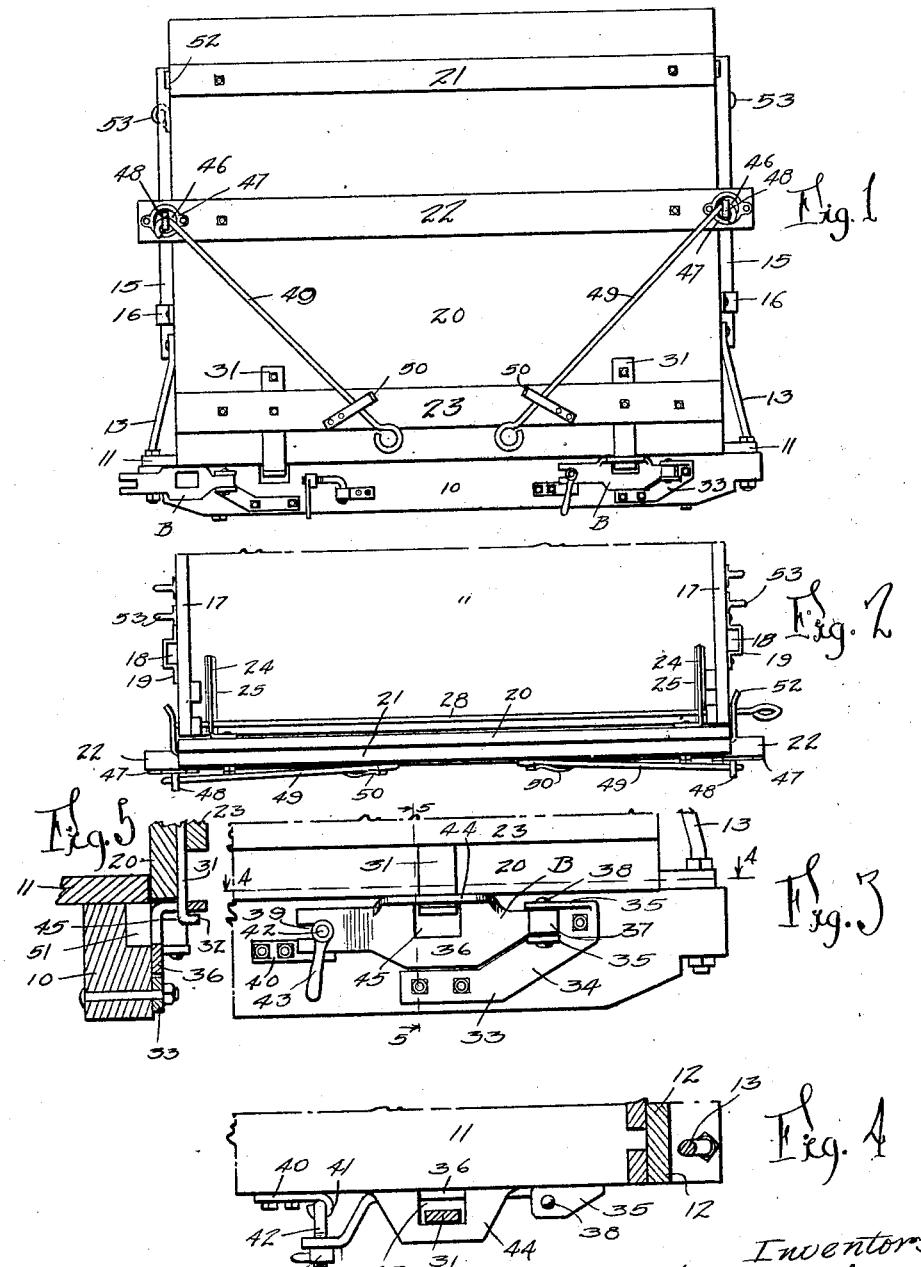

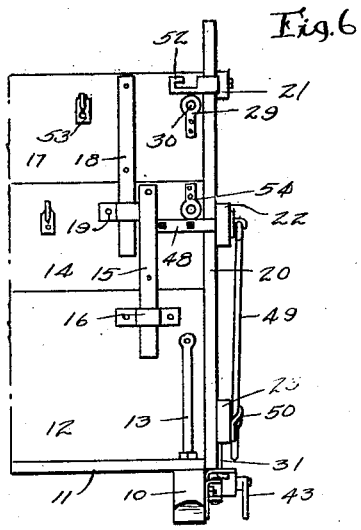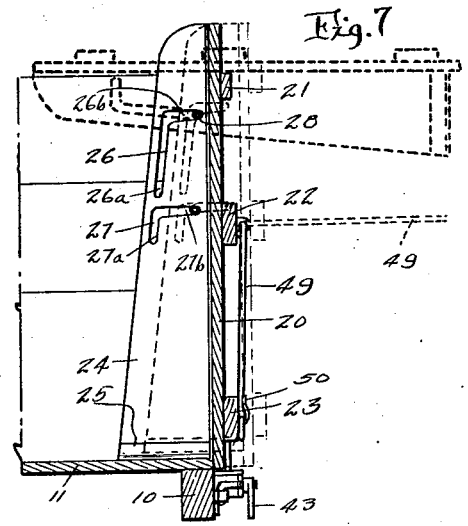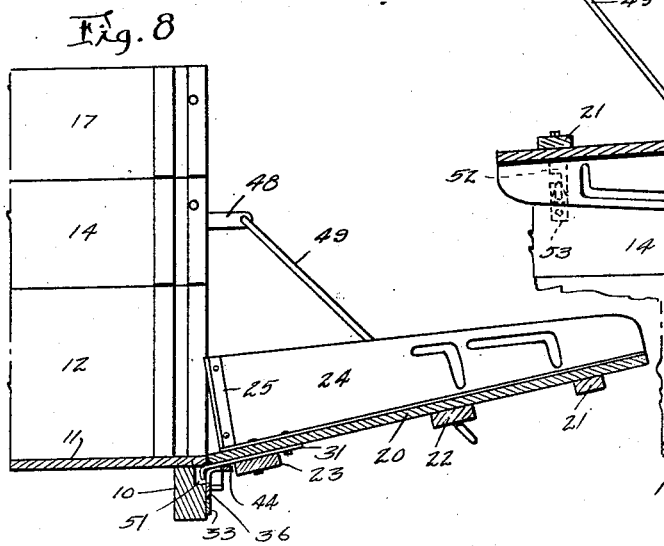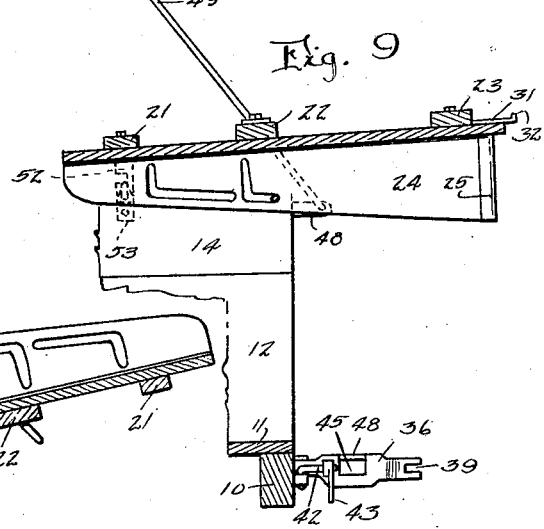

1,525,906

UNITED STATES PATENT OFFICE.

WALTER M. BARBOUR AND JOHN BARBOUR, OF GARDEN GROVE, IOWA.

END GATE.

Application filed August 23, 1923. Serial No. 658,901.

*To all whom it may concern:*

Be it known that we, WALTER M. BARBOUR and JOHN BARBOUR, citizens of the United States, residing at Garden Groove, in the county of Decatur and State of Iowa, have invented a certain new and useful End Gate, of which the following is a specification.

Our invention relates to end gates for use with farm trucks and farm wagons and has for its object to provide a gate of simple, durable and inexpensive construction, which is adjustable to various positions and which may be completely removed when desired.

More specifically, it is our object to provide an end gate which is held at its lower edge by a novel hinge construction, wherein the hinges may be opened so as to release the lower edge of the gate which may be swung upwardly and supported in horizontal position upon the upper edge of the side boards, and to permit the lower end of the gate to swing rearwardly and upwardly to permit dumping of grain or the like into the ordinary elevator dumps.

A still further object is to provide securing means for the upper portion of the gate upon which the gate is adapted to pivot and slide to the horizontal position mentioned after the lower hinges have been released.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1 is a rear elevation of a wagon box with our improved end gate attached thereto.

Figure 2 is a plan view of the rear portion of the wagon box with the end gate thereon.

Figure 3 is a detail view in elevation of one of the hinge constructions.

Figure 4 is a longitudinal, sectional view of the same taken on the line 4—4 of Figure 3.

Figure 5 is a vertical sectional view of the same taken on the line 5—5 of Figure 3.

Figure 6 is a side elevation of the rear portion of a wagon box with our end gate attached thereto, the gate being shown in horizontal position in dotted lines and in its closed position in full lines.

Figure 7 is a vertical, sectional view through the wagon box and end gate showing the end gate in its closed position in full lines, in one of the positions it assumes while being moved to the raised position in dotted lines and in the raised position in heavy dotted lines.

Figure 8 is a vertical, sectional view taken through one of the hinge members showing the gate in the lowered position it assumes when used as a scoop board; and Figure 9 is a vertical, sectional view through the wagon box with one of the side boards removed showing the gate in its raised position.

In the accompanying drawings, 10 is the rear cross beam of a wagon box or truck body, which supports the floor 11. The lower side boards 12 are fixed to the floor and braced to the beam by means of the brace 13. The intermediate side boards 14 are removably mounted on the sides 12 by means of the posts 15 fixed to the boards 14 and extended through the yokes 16 on the sides 12.

The upper side boards 17 are removably mounted on the side boards 14 by means of the posts 18 received in the yokes 19 on the boards 14.

Our end gate comprises the main body portion 20 which is reinforced by the cleats 21, 22 and 23, which also serve to support various portions of the mechanism comprising our end gate.

At each end of the end gate there is fixed a comparatively wide flange 24 which extends at right angles to the gate portion 20 and which may be bent at its lower edge forming a reinforcing band 25. The flanges 24 have the L-shaped slots 26 and 27, the purpose of which will be hereinafter more fully described.

Each of the slots 26 and 27 comprise a slot portion 26$^a$ and 27$^a$, as the case may be, which is parallel to the edge of the plate 24, and a slot portion 26$^b$ and 27$^b$ as the case may be, which is substantially perpendicular to the end gate member 20.

When the upper boards 17 are used, a rod 28 is extended through an opening 28$^a$ in one board 17, thence through the outer ends of the slot portions 26$^b$ in the flanges 24 and thence is threaded into a plate 29 on the other board 17, which has the threaded opening 30 to receive the rod 28, the end of which is threaded for the purpose.

Spaced from each end of the end gate, at the lower edge thereof and received between the cleat 23 and the member 20 is a hook 31, which is extended a little below the edge of the member 20 and has its end bent at right angles to the main portion thereof, as at 32.

The hooks 31 form part of the hinge construction for hinging the lower end of the end gate to the truck or wagon box. The portions of the hinge which are fixed to the wagon box, which we generally referred to by the reference character B comprise the fixed bracket 33, which extends upwardly at an angle, as at 34, and has at its end the ears 35 which are adapted to receive the pivoted member of the lower hinge structure B.

The pivot or swinging element of the lower hinge structure B comprises a plate 36 which is formed at its lower edge to conform to the upper contour of the bracket 33 and has at its end a loop 37 received between the ears 35 for pivoting the plate 36 to the bracket 34.

A pintle 38 secures the two together.

At its other end the plate 36 is bent outwardly, as shown in Figure 4 and is bifurcated at the end to form the slot 39.

In order to secure the pivoted member 36 in closed position, we provide the bracket 40 having at its end the loop 41, in which is pivotally mounted an L-shaped bolt 42 on the end of which is threaded a handled nut 43. The upper edge of the plate 36, at its center is bent over to form the horizontal latch member 44.

A slot 45 is cut in the member 44 and extends down into the plate 36.

The hooks 31, when the end gate is closed, extend into the slots 45 and the hook ends 32 engage the outer portion of the latch member 44 for locking the hooks 31 in position.

At each end of the cleat 22 adjacent the sides of the wagon box, are openings 46 which are reinforced by the rings 47. The bolts 48 are fixed to the sides of the boards 14 and extend through the openings 46.

Rods 49 are hooked through the ends of the bolts 48 and when the end gate is closed, the rods 49 are secured at their outer ends beneath the spring clasps 50 on the cleat 23.

It will be seen that when the rods 49 are in this position, they will securely lock the end gate in closed position against the end of the wagon box.

It will be seen that the hinge members form supporting means for the lower edges of the end gate when it is in its closed position or in its shoveling position.

The lower movable member is securely braced in position by means of the bracket 33, which supports the lower edge of the plate 36.

When it is desired to lower the end gate to the position shown in Figure 8, the rod 28 is removed, the rods 49 are removed from the clasps 50 and moved to horizontal position, when the hooked ends thereon will be allowed to slip through the openings 46, then the upper end of the end gate may be lowered, the gate swinging on its lower hinges.

It will be noted that in Figure 8, the hooks 31 may slide inwardly a little over the latch member 44, the cavity 51 being provided in the beam 10 for this purpose. Thus the lower edge of the end gate will come in close contact with the floor 11 of the wagon box and no grain will be lost through the crack between the end gate and the wagon floor. When in this position the end gate may be used as a scoop board upon which a man may stand while shoveling grain from the wagon.

When the gate is raised to the position shown in dotted lines in Figures 6 and 7, the nuts 43 are loosened until the bolt 42 may be swung around on its pivot for disengaging the forked ends of the swinging hinge members.

The swinging hinge members may then be moved to the position shown in Figure 1 at the left hand side of the figure, for disengaging the hooks 31.

The rods 49 are then disengaged from the clasps 50 and the entire end gate may be moved outwardly to the position shown in light dotted lines in Figure 7. This will bring the rod 28 to the corner of the slot 26.

The gate may then be pivoted on the rod 28 and slid upwardly and forwardly until the rod 28 reaches the lower end of the slot 26$^a$.

Hooks 52 are provided on the ends of the end gate, which are adapted to coact with the hooks 53 on the side boards 17. The hooks 52 serve to hold the end gate in its raised position.

If it is desired to use the wagon with only the side boards 14 in place, the boards 17 may be removed by removing the rod 28 and then slipping the posts 18 from the yokes 19.

The rod 28 may then be inserted through an opening in one of the sides 14 and extended through the slots 27, and through an opening in the other side 14 where it may be threaded into the threaded plate 54 similar to the plate 29.

The end gate may be swung to the position shown in Figure 9 in the same manner as it is swung to the position shown in Figures 6 and 7.

The end gate may be entirely removed by removing the rod 28 and removing the rods 49 from the clasps 50 and then unhooking the end gate from the hinge construction.

When wheat or other grain is carried, the end gate is in the position shown in solid lines in Figure 6 of the drawings.

To permit dumping of the small grain or the like from the truck body, the end gate is permitted to be moved on the rod 28 to the position shown in light dotted lines in Figure 7 of the drawings. The wheat or other small grain within the truck body will force the end gate outwardly and rearwardly near its bottom edge, thus causing it to swing upon the rod 28 as a pivot.

It will be understood that when the wagon is loaded with crates of vegetables or fruits or the like, the contents of the wagon will be much more accessible by moving the end gate to position as shown in Figure 7 in upper dotted lines.

It will be noted in this connection that the flanges 24 serve as side boards when the end gate is in shoveling position.

Some changes may be made in the construction and arrangement of the various parts of our invention, without departing from the real spirit and purpose of our invention, and it is our intention to cover by our claims any modified forms of structure or use of mechanical equivalents which may be reasonably included within their scope.

We claim as our invention:

1. In combination with a wagon box having a bottom and sides, an adjustable end gate therefor comprising a gate member, flanges thereon positioned to project into the wagon box adjacent the sides thereof when the member is in closed position, an L-shaped slot in each of said flanges, a rod received in the side boards of the wagon and extending through said slots and coacting members on said end gate and wagon box for securing the said gate to the wagon box, one of said members being capable of swinging movement and adapted when in closed position to form a hinge, the L-shaped slots being positioned to allow the end gate to slide and pivot on the rod so as to move from closed position to a horizontal position on the upper edge of the sides of the wagon.

2. In combination with a wagon box having a bottom and sides, an adjustable end gate therefor comprising a gate member, flanges thereon positioned to project into the wagon box adjacent the sides thereof when the gate is in closed position, a pair of L-shaped slots in each of said flanges, a rod received in the side boards of the wagon and extending through one of each of said pairs of slots and means for securing the lower end of said end gate when in its closed position, said last means comprising a hinge portion fixed to the lower edge of the end gate and a coacting swinging hinged portion fixed to said wagon box for forming a hinge connection between the wagon box and the end gate the L-shaped slots being positioned to allow the end gate to slide and pivot on the rod so as to move from closed position to a horizontal position on the upper edge of the sides of the wagon and means for securing the end gate in its raised position.

3. In combination with a wagon box having a bottom and sides an end gate comprising a gate member, hinge portions fixed to the lower edge thereof, coacting swinging hinged portions adapted when in closed position to form hinges together with the first mentioned hinge portions and adapted to swing to open position for releasing said first mentioned hinge portions, said swinging hinge portion having an opening therein, a hook portion on the other of said hinged portions adapted to extend into said opening for preventing any upward movement of the end gate when in closed position.

4. In combination with a wagon box having a bottom and sides an end gate comprising a gate member, hinge portions fixed to the lower edge thereof, coacting swinging hinged portions adapted when in closed position to form hinges together with the first mentioned hinge portions and adapted to swing to open position for releasing said first mentioned hinge portions, and means for securing the upper portion of the end gate in closed position.

Des Moines, Iowa, July 21, 1923.

WALTER M. BARBOUR.
JOHN BARBOUR.